May 25, 1965

F. J. SUELLENTROP ET AL 3,184,959

VELOCITY OF SOUND METER

Filed April 3, 1961

INVENTORS.
FRED J. SUELLENTROP
ALVIN E. BROWN
ERIC RULE
BY

George C Sullivan
Agent

May 25, 1965    F. J. SUELLENTROP ET AL    3,184,959
VELOCITY OF SOUND METER
Filed April 3, 1961    3 Sheets-Sheet 2
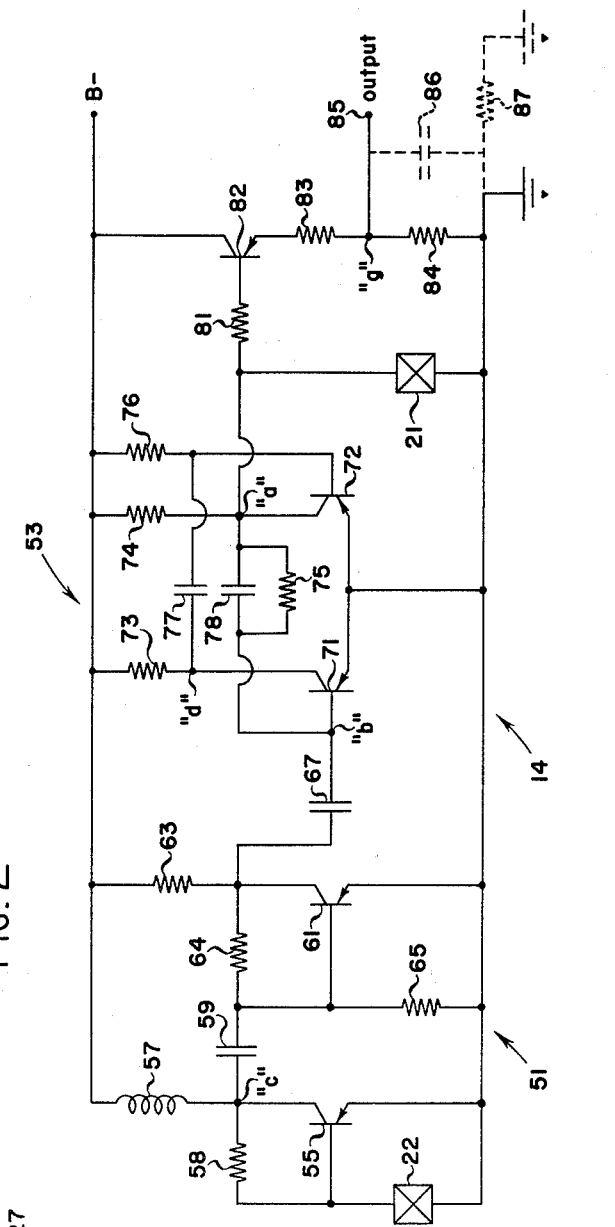
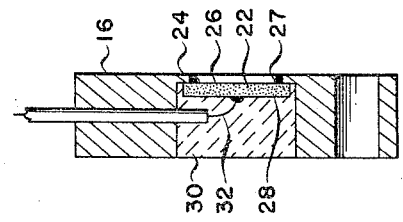
FIG. 1A
FIG. 2
INVENTORS.
FRED J. SUELLENTROP
ALVIN E. BROWN
ERIC RULE
BY
George C. Sullivan
Agent

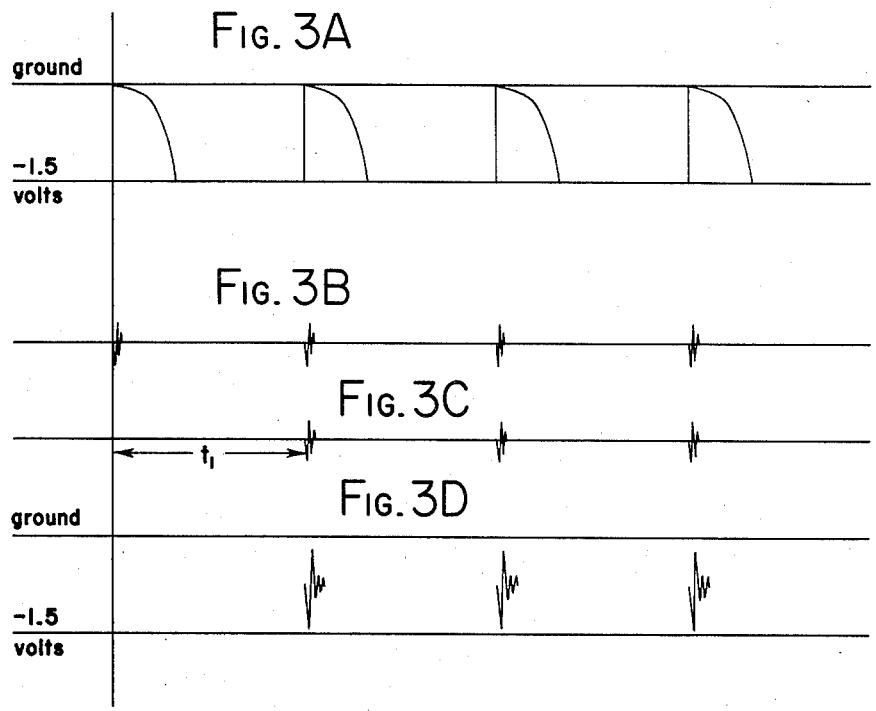
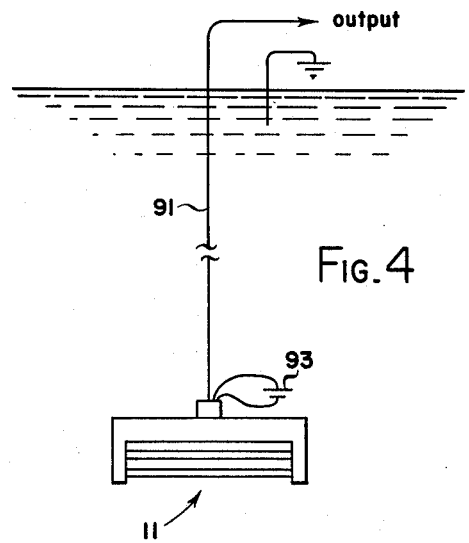

United States Patent Office 3,184,959
Patented May 25, 1965

3,184,959
VELOCITY OF SOUND METER
Fred J. Suellentrop, Mountain View, Alvin E. Brown, Sunnyvale, and Eric Rule, Palo Alto, Calif., assignors to Lockheed Aircraft Corporation, Burbank, Calif.
Filed Apr. 3, 1961, Ser. No. 100,185
1 Claim. (Cl. 73—53)

The present invention relates to a device for measuring the velocity of sound and more particularly to a device for measuring the velocity of sound in a liquid by employing the ring-around principle.

Devices performing the measurement of the velocity of sound by the ring-around principle basically consist of a transmitter and receiver spaced a predetermined distance (L) apart and a pulse generating source. The velocity measuring device is disposed in a liquid and the electrical pulse generated by the pulse source causes the transmitter to induce an energy pulse into the ambient liquid. This energy pulse is propagated through and traverses the distance (L) over a finite period of time ($t$) where it is received and converted into an electrical pulse by the receiver. The receiver output pulse instantaneously actuates the pulse generating source which causes it to generate another pulse which is applied to the transmitter and the sequence is then repeated. Since the time ($t$) required for the energy pulse to traverse the distance (L) is directly proportional to the acoustic velocity (C) of the ambient liquid, the time ($t$) may be expressed as:

(1) $$t = \frac{L}{C}$$

and since the pulse frequency ($f$) may be expressed as:

(2) $$f = \frac{1}{t} = \frac{C}{L}$$

the acoustic velocity of the ambient liquid is determined from the relationship:

(3) $$C = Lf$$

Prior devices for determining the velocity of sound in ambient liquid utilizing the ring-around principle have been effective; however, the electronic networks employed in these devices have required considerable power and have not been as sensitive as frequently desired. Furthermore, these systems have been relatively bulky, complex and expensive since it has been considered necessary to protect the electronics network from high pressures by means of large and heavy housings. In addition, since the output impedance of these prior devices has been relatively large, it has been considered necessary to suspend them by means of a plurality of lead wires in order to obtain the necessary electrical information.

The present invention obviates the disadvantages of the prior devices in that it is highly compact; inexpensive to produce, highly sensitive, insensitive to the direction of ambient currents and pressures and capable of transmitting reliable information by means of a single support wire. This is accomplished by utilizing a unique structural support and method for mounting the pulse generator and transmitter and receiver elements. In addition, the pulse generator comprises a unique circuit which has a low output impedance, bypasses low frequency signals, requires very small power and is highly sensitive and of fast response.

Accordingly, an object of the present invention is to provide a compact and inexpensive velocity of sound measuring device which is capable of withstanding large pressures.

Another object of the present invention is to provide a velocity of sound measuring device which may be supported and transmit information by only a single wire.

Still another object of the present invention is to provide a velocity of sound measuring device the transmitted energy pulses of which are independent of ambient currents.

A further object of the present invention is to provide a velocity of sound measuring device which is highly sensitive, has a rapid frequency response and is responsive only to signals having a frequency above a predetermined value.

A still further object of the present invention is to provide a velocity of sound measuring device which requires very little power.

The specific nature of the invention, as well as other objects, uses and advantages thereof, will clearly appear from the following description and from the accompanying drawing in which:

FIGURE 1A is a sectional view of the support block of FIGURE 1.

FIGURE 2 is a schematic illustration of the pulse generating circuit of the present invention.

FIGURE 3 is a graph showing various pulse signals to illustrate the operation of the device shown in FIGURES 1 and 2.

FIGURE 4 is an illustration of the device of FIGURES 1 and 2 showing the single wire support and ground return scheme.

Like numerals designate like elements throughout the figures of the drawing.

Figure 1:
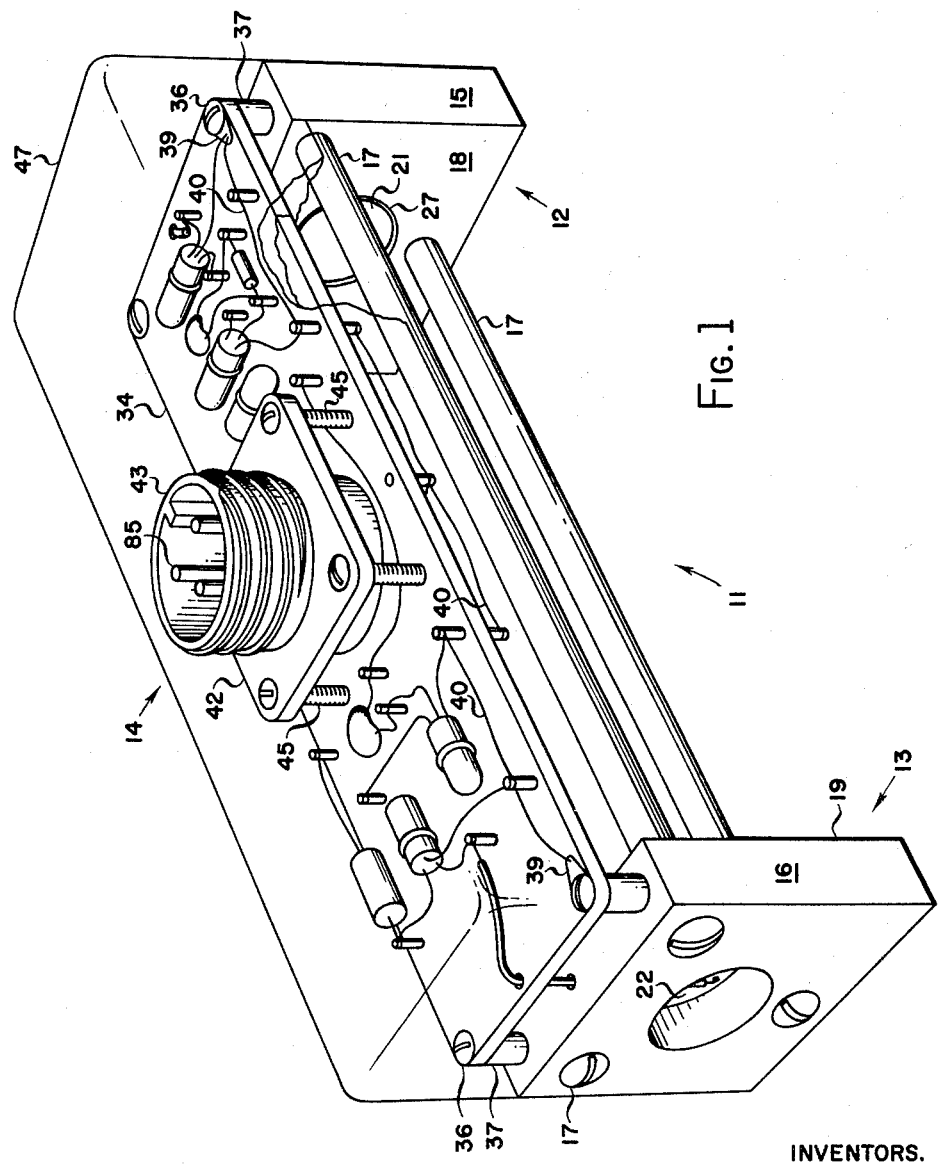
FIGURE 1 is a perspective view illustrating the structural configuration of the velocity of sound measuring device of the present invention.

In FIGURE 1 is shown the velocity of sound measuring device of the present invention as generally denoted by reference numeral 11. Device 11 consists generally of transmitter section 12, receiver section 13, and pulse generator section 14. Transmitter section 12 and receiver section 13 consist respectively of relatively thin blocks 15 and 16 made of electrical conducting and corrosive resistant material each of which has four openings drilled through the face thereof. Three rods 17, made of Invar or other material preferably having a low coefficient of thermal expansion, are mounted in respective opposite openings in blocks 15 and 16. These rods are rigidly fixed to blocks 15 and 16, as by means of weld or press fit, to maintain interior faces 18 and 19 parallel and at a fixed predetermined distance therebetween. A distance of 10 centimeters between interior faces 18 and 19 has been found satisfactory for use with the hereinafter described components; however, it is to be understood that substantial departure from this distance may be made and remain within the scope of the present invention. Transmitting transducer disc 21 and receiving transducer disc 22 are mounted in the center openings of blocks 15 and 16.

The construction of transmitting section 12 is identical to the construction of receiving section 13. A detailed cross sectional view of section 13 is shown in FIGURE 1A wherein the center opening of block 16 has a small annular inwardly extending collar 24. Interior surface 26 of disc 22 is attached to collar 24 by means of solder 27 or similar material, which is deposited about the entire peripheral surface. In this manner the interior surface of disc 22 is electrically connected to collar 24 of block 16 and a relatively large surface area is exposed to liquid. It is necessary that interior surface 26 and exterior surface 28 of disc 22 be electrically insulated and the annular solder ring 27 also functions to prevent liquid from entering the space between surface 26 and collar 24. Liquid is prevented from contacting surface 28 by filling the opening adjacent surface 28 with epoxy resin 30. The epoxy resin is selected to be sufficiently ductile so the force of water against the exterior surface thereof is transmitted to interior surface 28. Therefore, no differential force will exist between surfaces 26 and 28 and rupture of disc 22 is obviated even when exposed to very large pressures. In addition, the epoxy resin is selected so the acoustic impedance matching between the disc and resin is very poor and therefore little or no energy is transmitted to the resin when the disc resonates. Lead wire 32 is connected to surface 28 and passed through a small opening in block 16 to the hereinafter described pulse generating section 14.

The electronic components of the pulse generating section 14 are connected to both sides of mounting board 34. Mounting board 34 is made of dielectric material and is rigidly attached to blocks 15 and 16 by screws 36 or similar fastening means. A spacing between board 34 and blocks 15 and 16 may be provided by employing spacing elements 37 through which screws 36 are passed. Lugs 39 of internal electrical ground wire 40 are inserted under the heads of screws 36 to provide grounding of the interior surfaces of discs 21 and 22. Support plate 42 of outlet socket 43 is rigidly attached to mounting board 34 by means of screws 45 or other suitable fastening means.

After the above-described elements of the pulse generating section are assembled, an epoxy resin potting compound 47 is molded substantially as shown in FIGURE 1. In this manner all of the electrical elements, mounting board 34, support plate 42 and various attaching elements are enclosed by a waterproof material and therefore protected from ambient liquid which generally has electrical conducting and corrosive characteristics. Since all of the hereinafter described electrical components (transistors, coils, resistors, capacitors, etc.) are able to withstand large compression pressures, their successful operation is not impaired by the large pressures to which they are subjected. In addition, to reduce the pressure to which the electrical components are subjected, it is preferable that epoxy resin potting compound 47 be rigid in compression so the load due to external pressures will not be readily transmitted to the electrical components.

In view of the foregoing, it can be seen a highly compact and rugged structure is obtained which is capable of withstanding great pressures, maintains close critical distance tolerances, protects critical elements from corrosive and electrical conducting ambient liquids and provides pressure compensation for the transmitter and receiver discs.

In FIGURE 2 is schematically illustrated transmitting disc 21, receiving disc 22 and the pulse generating circuit 14. Discs 21 and 22 may be made of barium titanite having a predetermined resonate frequency which is primarily dependent upon the physical dimensions of the discs. Each of these discs is matched and has a resonant frequency of about 4 megacycles. It is to be understood that discs may be selected having a substantial departure from this frequency and corresponding variations of circuit parameters may be employed and remain within the scope of the present invention. In FIGURE 3A is shown the voltage signal at point "$a$" of FIGURE 2 as a function of time. Typical pulse frequencies which may be encountered in sea water range from about 138 to about 144 kilocycles per second. Therefore the time between the pulses of FIGURE 3A is of the order of 70 microseconds. It is to be particularly noted that the leading edge of these pulses has a nearly infinite slope and therefore includes high frequency components of at least 4 megacycles. The trailing edges, however, have considerably less slope and do not include frequency components as high as 4 megacycles.

Since the leading edge of these pulses includes frequency components which exceed the minimum frequency response of these discs, disc 21 is caused to resonate at each instance when one of these pulses is applied thereto. However, disc 21 will not be caused to resonate by the trailing edges since they do not include component frequencies which are equal to or greater than the minimum frequency response thereof.

When disc 21 is caused to resonate, an energy pulse is induced into the ambient liquid as illustrated in FIGURE 3B and is received by disc 22 after some finite time interval ($t_1$) as shown in FIGURE 3C. The energy pulse received by disc 22 is converted into an electrical signal and applied to the input of amplifier circuit 51 resulting in an electrical signal at point "$b$" as shown in FIGURE 3D. This electrical signal triggers multivibrator circuit 53 which has a resulting voltage output at point "$a$" as illustrated in FIGURE 3A. The sequence is then repeated. The time lag between the receipt of the energy pulse by disc 22 (FIGURE 3C) and the resultant output signal of multivibrator 53 (FIGURE 3A) is negligible.

Amplifier circuit 51 includes transistor 55 which has the collector thereof connected through choke coil 57 to the B— power supply. Resistor 58 is provided to set the operating point of transistor 55 and choke coil 57 functions both as a high pass filter and a collector load. As a high pass filter, coil 57 shunts low frequency signals appearing at point "$c$" to the B— power supply and in this manner prevents unwanted low frequency signals from being transmitted through coupling capacitor 59. Low frequency signals may be derived from pressure waves striking disc 22 and if these signals were not shunted by choke coil 57, they would trigger transistor 61 and multivibrator circuit 53 which would cause disc 21 to resonate at an improper time. Resistor 63 provides a collector load and resistors 64 and 65 set the operating point for transistor 61 and the output signal from transistor 61 is connected through coupling capacitor 67 to point "$b$".

Multivibrator circuit 53 includes transistors 71 and 72 and collector loads therefor are respectively provided by resistors 73 and 74. The base of transistor 71 is connected through resistors 74 and 75 to B— wherein the series resistance of these resistors is relatively low to provide an overbias of transistor 71. Since transistor 71 is overbiased the multivibrator will free run without receiving pulses from disc 22 at a frequency less than the operating frequency when the system is immersed in a liquid.

When the base of transistor 71 is driven positive, it will become nonconducting and the voltage at point "$d$" is rapidly diven negative. This negative going signal is coupled to the base of transistor 72 through capacitor 77 and therefore drives transistor 72 to conduction. When transistor 72 is conducting, point "$a$," which is coupled through resistor 75 and capacitor 78 to the base of transistor 71, is driven positive and consequently causes transistor 71 to assume a highly nonconducting state. Transistor 71 will again become conducting at a time determined by the time constant of capacitor 78 and resistor 74. The sequence is then repeated when the base of transistor 71 is again driven positive.

The output (point "$a$") of multivibrator circuit 53 is applied directly to disc 21. Barium titanite discs have high capacitance and consequently a low impedance coupling to ground is provided. Since the resistance of resistor 74 is low and transistors 71 and 72 have grounded emitters, the output impedance of the multivibrator circuit is low and can therefore directly drive disc 21.

The emitter of transistor 82 is connected in series through resistors 83 and 84 to ground. Since point "$a$" is directly coupled through bias resistor 81 to the base of transistor 82, transistor 82 is conducting when transistor 72 is nonconducting. Therefore, the output voltage at point "$g$" directly follows the voltage at point "$a$" or the input voltage to disc 21. It should be noted that if the output lead should become shorted to ground, transistor 82 will be protected due to the current limiting action of resistor 83.

It should be particularly noted that the output impedance of transistor 82 is very low and the effective impedance from the output terminal is the value of resistor 83. Assuming the device is suspended in salt water by 1000 feet of wire electrically connected to output terminal 85 of outlet socket 43 as illustrated in FIGURES 1 and 4, the capacitive coupling between the output wire and the adjacent salt water (effective ground) is indicated by capacitor 86 (shown in dotted lines in FIGURE 2) and has a value of approximately .01 microfarad. With resistors 83 and 84 having values of approximately 500 and 10,000 ohms, respectively, and capacitor 86 having an impedance of approximately 1000 ohms (assuming operation at about 15 kilocycles), the output loss to internal ground is about 25 percent. Whereas, if the output impedance of transistor were of the order of about 5000 ohms, which is generally the case, then this loss would increase to about 80 percent. With only 25 percent internal loss it is possible to use the ambient liquid as the return ground as shown in FIGURE 4. Using salt water as the return ground, at 1000 feet there would be approximately 5000 ohms resistance as denoted by resistor 87 shown in dotted lines. Therefore, with the above-mentioned output impedance of 5000 ohms there would be a total loss of about 95 percent whereas, with an output impedance of 500 ohms the total loss would be only about 30 percent. With only 30 percent loss it can therefore be seen the present invention may effectively utilize the salt water as the return ground which renders it possible to employ only a single wire to support and obtain information from the velocity of sound measuring device.

From FIGURES 1 and 4 it can be seen the velocity of sound measuring device is supported by output wire 91 which is operatively connected to outlet socket 43. Outlet socket 43 is positioned to axially align approximately with the center of gravity of the device so when suspended, the Invar rods will remain horizontal and the device may freely rotate about wire 91. Since the over-all device is symmetric and blocks 15 and 16 provide a relatively small surface area when viewed perpendicularly as compared with parallel to the axis of Invar rods 17, the device will rotate about wire 91 to align the Invar rods perpendicularly to the direction of flow of the ambient liquid. Since the ambient liquid flow remains perpendicular to the Invar rods there is no effect on the time of transmission of the energy pulses from disc 21 to disc 22. Whereas, if the flow had a velocity component parallel to the Invar rods and between the discs, there would be an addition to or subtraction from the time of transmission of the energy pulse. It is to be understood that additional thin plates or similar devices may be attached to the velocity of sound measuring device to assist blocks 15 and 16 to maintain the above described directional characteristics. In addition to the above-described separation function of Invar rods 17, they also function to shield the area between discs 21 and 22 from high velocity flow and yet allow sufficient flow so nonambient liquid is not trapped between the discs. Low voltage power may be obtained from power source 93 which may be a sea water battery or a standard battery and connected to appropriate terminals of outlet socket 43. It is preferable that where a standard battery is employed that it be attached to the velocity of sound measuring device and be exposed to the ambient liquid since it may then be readily replaced. It is to be understood, however, that it may be enclosed in material 47 along with the components of the pulse generating device.

The following is a tabulation of the values of elements employed in the present invention. It is to be understood these values are only exemplary and substantial departure therefrom may be made and remain within the scope of the present invention.

| Elements: | | Values |
|---|---|---|
| 57 | microhenries | 100 |
| 58 | ohms | 100,000 |
| 59 | micromicrofarads | 1,800 |
| 63 | ohms | 1,000 |
| 64 | do | 200,000 |
| 65 | do | 20,000 |
| 67 | micromicrofarads | 560 |
| 73 | ohms | 1,000 |
| 74 | do | 1,000 |
| 75 | do | 10,000 |
| 76 | do | 200,000 |
| 77 | micromicrofarads | 1,800 |
| 78 | do | 1,000 |
| 81 | ohms | 10,000 |
| 83 | do | 510 |
| 84 | do | 10,000 |
| B— | volts | −1.5 |

It is to be understood in connection with this invention that the embodiment shown is only exemplary, and that various modifications can be made in construction and arrangement within the scope of the invention as defined in the appended claim.

What is claimed is:

A velocity of sound measuring device for fluids comprising:

(a) a substantially U-shaped frame including an elongated member forming the cross bar of said U and a pair of substantially parallel transducer mounts having apertures therethrough depending from said elongated member forming the legs of said U whereby fluid substantially surrounds said mounts when said device is immersed in a liquid, (b) a first transducer mounted in one of said transducer mount apertures and a second transducer mounted in the other of said transducer mount apertures (c) a non-conductive, non-corrosive chemical compounds securing said transducers in said aperture, (d) a solid-state type pulse generating device operatively connected to an output terminal and to the input of said first transducer for applying an electrical pulse thereto, (e) said pulse generating device operatively connected to the output of the second transducer for generating a pulse in response to an electrical output signal therefrom, (f) said pulse generating device including means for bypassing frequencies less than the resonant frequency of said transducers whereby said pulse generating device generates a pulse only when the output frequency of said second transducer is greater than said resonant frequency, (g) said pulse generating device being embedded in non-conductive, non-corrosive chemical compound, said compound protecting said pulse generating device from corrosion due to environment, (h) a single lead wire operatively connected to said output terminal for transmission of the electrical pulse generated by said generating device and for supporting said velocity of sound measuring device at approximately its longitudinal center of gravity in a normally substantially horizontal position, (i) the ground lead being connected to the exterior of said device whereby when said device is immersed in a fluid, a circuit is completed through the liquid, and (j) said pulse generating device having a low impedance output, including a capacitive coupling between said lead wire and the liquid.

References Cited by the Examiner

UNITED STATES PATENTS 2,965,877   12/60   Stein et al. _____ 340—13
2,985,812   5/61   Peterson _____ 317—99 X
2,986,695   5/61   Buell _____ 324—10

OTHER REFERENCES

"Sing-Around Ultrasonic Velocimeter for Liquids" (Greenspan et al.), published by Review of Scientific Instruments, November 1957, vol. 28, No. 11, pages 897–901.

WALTER L. CARLSON, *Primary Examiner.*